358-86. XR 3,492,418 SR

Jan. 27, 1970 DE LOSS J. TANNER 3,492,418

SIGNAL TRANSMISSION SYSTEM USING DC CONTROL SIGNALS TO SELECTIVELY OPERATE A TELEVISION RECEIVER AS A MONITOR AND TO CONTROL AN INTERCOM SYSTEM

Filed April 26, 1967 2 Sheets-Sheet 1

Inventor
DE LOSS J. TANNER, Decease
ARTHUR L. HELLYER, Administrator.
By Mueller, Aichele & Rauner
Attys.

Jan. 27, 1970 DE LOSS J. TANNER 3,492,418

SIGNAL TRANSMISSION SYSTEM USING DC CONTROL SIGNALS TO SELECTIVELY OPERATE A TELEVISION RECEIVER AS A MONITOR AND TO CONTROL AN INTERCOM SYSTEM

Filed April 26, 1967 2 Sheets-Sheet 2

Inventor
DE LOSS J. TANNER,
Deceased
ARTHUR L. HELLYER
Administrator.
By Mueller, Aichele & Rauner
Attys.

United States Patent Office 3,492,418
Patented Jan. 27, 1970

3,492,418

SIGNAL TRANSMISSION SYSTEM USING DC CONTROL SIGNALS TO SELECTIVELY OPERATE A TELEVISION RECEIVER AS A MONITOR AND TO CONTROL AN INTERCOM SYSTEM

De Loss J. Tanner, deceased, late of Bensenville, Ill., by Arthur L. Hellyer, administrator, Wheaton, Ill., assignor to Motorola, Inc., Franklin Park, Ill., a corporation of Illinois Filed Apr. 26, 1967, Ser. No. 635,317
Int. Cl. H04n 7/00
U.S. Cl. 178—5.6 9 Claims

ABSTRACT OF THE DISCLOSURE

The system includes a camera with one section of an audio intercom nearby. A television receiver and another section of the intercom are located at some distance from the camera. A switch near the receiver has a first position to connect an antenna to the receiver and to simultaneously turn off the came-a and the audio intercom. A second position disconnects the antenna, connects the camera to the reeciver, and turns the camera and intercom on. A cable connecting the camera to the receiver has a single shielded conductor for transmission of the camera signal, the audio intercom signal and the power on-off control.

BACKGROUND OF THE INVENTION

An inexpensive miniaturized camera has a great many varied applications both in small businesses and in the home. For example, such a camera may be placed in the nursery and a receiver may be placed in a convenient location such as the kitchen to permit continued surveillance of the baby while going about one's normal routine. A microphone may be placed along side the camera with a corresponding speaker located near the receiver to monitor the baby's sounds. Or, the camera may be placed outside the house near a door so that when a visitor comes his identification may readily be determined. In such a case, a two-way audio intercom would also be desirable to permit talking and listening to the visitor. In either of these examples, and in fact a great many more, the consumer, although willing to pay the cost of the camera, may be unwilling to buy a receiver. It has been proposed, therefore, to permit use of a standard television receiver as either the monitor for the camera or to receive normal commercial programming . If the television is located in the family room, for example, and a visitor calls, the viewer would merely position a switch to turn off the commercial program and turn on the external camera and also to render an audio intercom system operable.

In the past, in order to provide control of the camera power at the receiver, the 120 volt line voltage located at the receiver was transmitted to the camera via expensive specially installed conduit wiring. Another presently used method to control the on-off function requires the use of unreliable and expensive relays. Some systems provide an on-off control by sending an AC signal from the receiver location which if transmitted on the same conductor with the video signal, would require another conductor to transmit the audio if the purchaser wished to have intercom features. A larger cable would be required to carry the additional conductor and thus it would be more difficult to make the cable unobtrusive. Generally, present day remote control systems are directed towards industrial applications where a monitor is included with the camera so that compatible use of the camera with a standard television receiver is not required.

SUMMARY OF THE INVENTION

It is, therefore, an object of this invention to provide a signal transmission system in which the video signal from a camera, the audio signal from an intercom, the on-off control for the camera, and the on-off control for the intercom are all conducted in a coaxial cable having a single shielded conductor.

Another object is to provide a camera with its own power supply and a switch near a standard television receiver to furnish a DC signal such as a DC short to tu-n the power supply on and off and to translate the signal along with the camera signal on a shielded single conductor coaxial cable.

Another object is to provide a switch near a standard television receiver which requires a single, simple operation to turn on a remotely located camera, turn on an audio intercom, disconnect the antenna from the receiver, and couple the camera to the receiver.

A further object is to provide a system having video transmitting capabilities which is compatible with a standard television receiver.

In a preferred form of the invention, the output terminal of a camera at which the camera signal appears, is connected through an RF choke to a selected point within the camera power supply which, when shorted to ground, will turn the power supply off. The output terminal is connected to an input electrode of an electronic switch with its common electrode connected to ground. A control signal of a given amplitude will saturate the switch and will therefore ground the selected point in the power supply. A sound transducer is coupled to the switch and an impedance such as a capacitor is connected in shunt with the switch and the transducer to conduct the camera signal. A coaxial cable having a single shielded conductor is direct current connected from the switch and the impedance through an amplifier device to another sound transducer. Another impedance is connected in shunt with the amplifier device to conduct the camera signal. The amplifier device is direct current connected to a first manual switch which has a first position in which the amplifier device is operable and a second position in which it is inoperable and generates the control signal. The control signal is coupled back to the electronic switch by means of a feedback device connected between the amplifier device and the coaxial cable. A second manual switch is ganged with the first switch to connect the cable to the receiver when the first switch is in the first position so that it may receive the camera signal, and to connect the antenna to the receiver when the first switch is in the second position so that the receiver may receive commercial programming.

DESCRIPTION OF THE PREFERRED EMBODIMENTS

Figure 1:
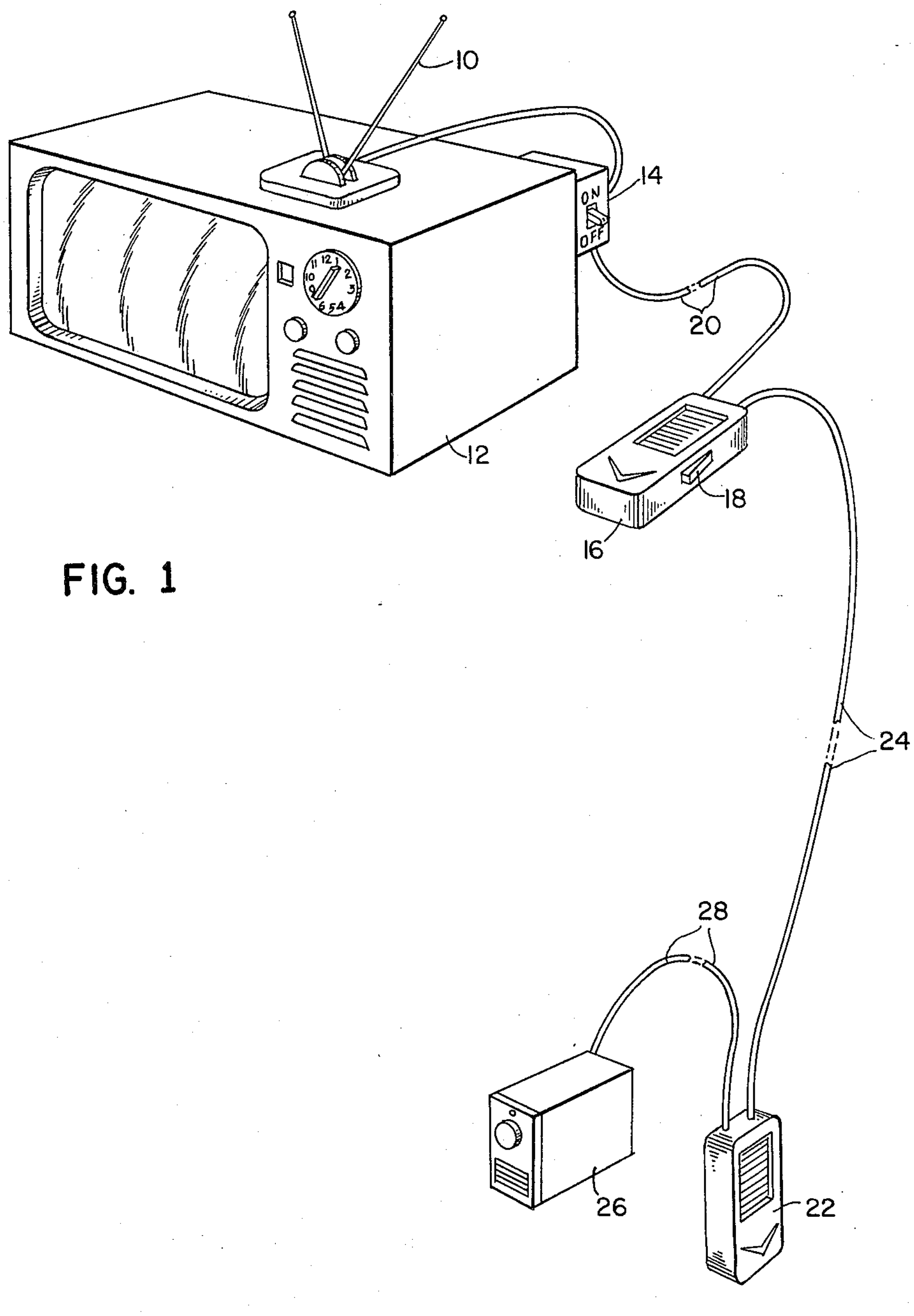
FIG. 1 illustrates a preferred arrangement of the various components of the signal transmission system according to this invention.

In FIG. 1 an antenna 10 is connected to a standard television receiver 12 through a control unit or switch 14. A master unit or first section of an audio intercom system 16 has a push-to-talk switch 18 and is connected to switch 14 by a coaxial cable 20. The cable 20 may be of any convenient length such as, for example, long enough to permit the user to hold the master unit 16 while he is comfortably watching television. The master unit 16 is connected to a slave unit (so-called because the master unit 16 determines which unit is to receive and which is to transmit audio) or second section of an audio intercom system 22 by means of a coaxial cable 24 which may, if desired, be extremely long in order to permit the camera 26 and the slave unit 22 to be a distance from the receiver 12 and the master unit 16. The camera 26 is connected to the slave unit 22 by means of a coaxial cable 28. In the on position, switch 14 actuates the master unit 16 and the slave unit 22, turns on camera 26, disconnects antenna 10 from the receiver 12 and couples the camera signal to the receiver, and vice versa in the off position. Each of the three coaxial cables 20, 24 and 28 have only a single conductor and a shield (shown schematically in FIG. 2) which carries the camera signal from camera 26 to the television receiver 12, the audio between master unit 16 and slave unit 22, and the on-off controls for the camera and the master unit. It may be appreciated that since the cables each have only a single signal conductor, their diameter may be very small and therefore easily hidden from view. In a practical construction, cables having a one-tenth of an inch diameter were used.

Figure 2:
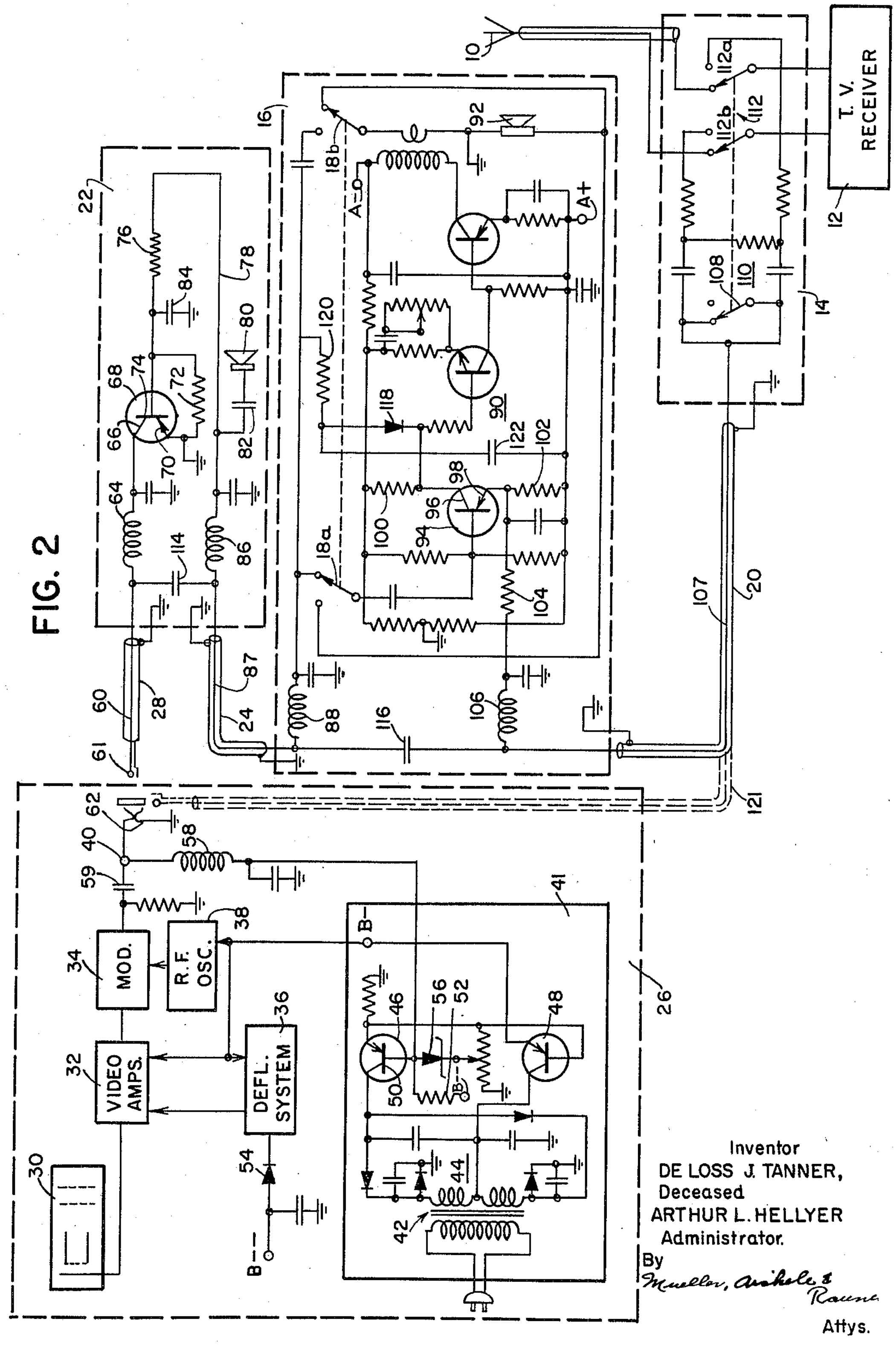
FIG. 2 is a diagram partially schematic and partially in block of a signal transmission system with audio intercom features.

Referring now to FIG. 2 for a description of the various circuits in the components of the signal transmission system of FIG. 1, the camera 26 includes a vidicon tube 30 to convert light reflected from a selected object into a video signal which is amplified by video amplifier 32 and applied to modulator 34. Horizontal and vertical sweep signals are developed by deflection system 36 and applied to horizontal and vertical yokes (not shown) disposed on the vidicon tube 30. The deflection system is coupled to video amplifier 32 to insert horizontal and vertical synchronizing pulses into the video signal. An oscillatory signal from RF oscillator 38 is applied to modulator 34 to mix with the video signal and provide an RF or camera signal at output terminal 40.

The camera 26 has a built-in power supply 41 which includes a power transformer 42, a rectifying network 44 to apply DC voltages to the collectors of regulating transistors 46 and 48, the former of which has its base electrode 50 connected through a resistor 52 to a B− supply. This B− voltage is developed by a diode 54 coupled to the horizontal portion of deflection system 36 to rectify a portion of the horizontal sweep signal. A Zener diode 56 establishes a reference voltage for the base 50 of transistor 46 which in turn develops a regulated voltage on the emitter thereof. This voltage is coupled to transistor 48 which provides a regulated B− voltage on its emitter for use by video amplifier 32, deflection system 36, RF oscillator 38 and other circuitry in the camera 26. It is important to note that shorting base 50 to ground provides means to cut off the power supply 41 as there is no base current in the transistor 46 and therefore the B− voltage will disappear as will the B− voltage. Without these voltages, the camera 26 is inoperative.

The base 50 is coupled to terminal 40 by an RF choke 58 which is a high impedance to the camera signal to prevent application thereof to the power supply 41 and yet provide means by which terminal 40 may be connected to ground to turn off the power supply. Capacitor 59 isolates the B− voltage from the modulator 34. The shielded coaxial cable 28 has a single signal conductor 60 connected to a plug 61 to be inserted in the jack 62 which is connected to terminal 40. With the plug removed, terminal 40 is automatically shorted to ground so that the camera 26 is turned off.

The coaxial cable 28 is coupled to the slave unit 22 with the signal conductor 60 connected through an RF choke 64 to an input electrode or collector 66 of a switching transistor 68, the emitter 70 of which is connected to ground. Resistor 72 is connected from the base 74 to ground and along with resistor 76 provides a voltage divider action for a control signal applied to lead 78. A sound transducer 80 which may be used as a speaker or a microphone is coupled through a capacitor 82 to lead 78. Audio signals on lead 78 are isolated from transsistor 68 by resistor 76 and bypass capacitor 84. Lead 78 is coupled through an RF choke 86 to the signal conductor 87 of coaxial cable 24.

The other end of cable 24 is coupled to master unit 16 with the signal conductor 87 connected through an RF choke 88 to an amplifier circuit 90 the output of which is connected to a sound transducer 92 which is usable as a speaker and as a microphone. The push-to-talk switch 18 comprises a pair of portions 18*a* and 18*b* and in the position shown, sounds applied to transducer 80 in slave unit 22 are converted into electrical signals and coupled through cable 24 and portion 18*a*, amplified by amplifier circuit 90 and applied to the transducer 92 for reconversion into sounds. In the other position, sounds applied to transducer 92 are converted into electrical signals and coupled through portion 18*a* to and amplified by amplifier circuit 90, and coupled through portion 18*b* and cable 24 to transducer 80 for reconversion into sounds. Alternately, the push-to-talk switch and the amplifier circuit may be located near the camera 26 rather than near the receiver 12. Also, the intercom need not be two-way in which case one unit would house the microphone apparatus and the other unit would house the loudspeaker apparatus.

Amplifier circuit 90 includes an amplifier device 94 here shown to be a PNP transistor having a collector 96 and an emitter 98. Collector 96 is coupled through a load resistor 100 to a source of A− voltage and emitter 98 is coupled through a load resistor 102 to a source of A+ voltage. These voltages may be supplied by a battery self-contained within the master unit 16. Emitter 98 is coupled through a resistor 104 and an RF choke 106 to the signal conductor 107 of coaxial cable 20.

The other end of cable 20 is coupled to control unit 14 with the signal conductor 107 connected to an on-off switch 108. The signal conductor is further coupled through a matching network 110 to a double pole, double throw switch 112 which is ganged with switch 108 and which has a portion 112*a* connected to the reference conductors of the antenna 10, the receiver 12 and the matching circuit 110. The three contacts of portion 112*b* are respectively coupled to the signal conductors of antenna 10, receiver 12 and matching circuit 110.

The camera signal from camera 26 is bypassed around the slave unit 22 by capacitor 114 and is bypassed around the master unit 16 by capacitor 116 and is isolated from the respective units by the chokes 64–86 and 88–106. Capacitor 114 is a high impedance to audio to prevent it from being coupled back to the camera through cable 28. Chokes 88 and 86 are low impedances to audio to provide an uninhibited path between transducers 80 and 92. Likewise, capacitor 116 prevents audio from being applied to the control unit 14. The capacitors associated with the RF chokes further isolate the respective signals. It is important to note that the camera signal is at RF and therefore it has no frequencies common with the audio signals from the intercom system so that this isolation is attainable.

In operation, when switch 108 is in the position shown, a short to ground is transmitted through cable 20, choke 106 and resistor 104 to the emitter 98 of transistor 94 in master unit 16 so that the transistor is turned off. This serves to turn off the entire amplifier circuit 90 since the three transistors therein are DC connected to thereby minimize current drain when the intercom is not being used.

A diode 118 has its cathode connected to collector 96 of transistor 94 and its anode connected through a resistor 120 through choke 88 to the signal conductor 87 of cable 24 with a filter capacitor 122 connected from the diode anode to the A+ voltage. With the switch 108 in control unit 14 in the position shown, transistor 94 no longer draws current so that the voltage on collector 96 is substantially equal to the A— voltage which is of the proper polarity to forward bias diode 118 so that it conducts the A— voltage through the resistor 120, cable 24, and resistor 76 to the base 74 of the switching transistor 68 in slave unit 22. The magnitude of the negative voltage thereat may be selected by the relative sizes of resistors 72 and 76 to control the amount of division and is to be sufficient to saturate the transistor to place collector 66 substantially at ground which, when translated back to the camera power supply 41, will turn off the camera 26 as explained previously.

Since switch 112 is ganged with switch 108, in the position shown the antenna 10 is coupled to the receiver 12 to permit pickup of commercial programing. Also, the audio intercom is off, and the camera 26 is off. When the switches 108 and 112 are placed in the other position, the master unit 16 becomes operable to permit audio transmission, the power supply 41 is unshorted to turn on the camera 26, the antenna 10 is disconnected from the receiver 12 and the matching circuit 110 connects the camera signal to the receiver.

The control signal developed by control unit 14 is merely a change in DC potential, and preferably as in the case shown, such change is from open to shorted conditions. Thus the control signal does not interfere with either the audio interchange between master unit 16 and slave unit 22 or the video components of the camera signal. It is important to note that none of the cables have more than a single shielded signal conductor so that they, and especially cable 24, may have small diameters. Cable 20 carries the camera signal and the on-off controls for both the master unit 16 and the camera system 26. Cable 24 carries the audio interchange, the camera signal, and the on-off control for the camera. Cable 28 carries the camera signal and the on-off control for the camera.

In a particular application where use of an audio intercom system is not necessary, the control unit 14 according to this invention may be connected directly through a coaxial cable represented by dotted lines 121 to the camera 26. Again a DC control voltage, in this case a short, no-short selection, is used to turn the camera on and off so as to insure negligible interference with the video signal. As in the case utilizing the audio intercom system, the switch 112 is ganged with the on-off to provide selection between commercial program reception or camera signal reception simultaneously with turning the camera off and on.

A further advantage of the embodiments discussed is that no changes are required in the standard television receiver to use the above disclosed system since the camera is compatible therewith. The only step necessary is to connect the antenna 10 and the receiver antenna terminals to the control unit 14. Also, since the control signal is not AC, it does not interfere with the audio intercom signal. The expensive conduit installation for carrying line voltage from the television receiver location to supply camera power is obviated. In addition, no expensive power consuming relays are required but rather switching is accomplished by reliable semiconductors and/or manual switches.

What has been described, therefore, is a novel and inexpensive signal transmission system which is usable with a standard television receiver and is controlled by a unit near the receiver and in which the on-off control and the camera signal are transmitted on the same conductor. An audio intercom system is easily installed therewith in which the voice transmission, the on-off for the intercom and camera, and the camera signal are transmitted on coaxial cables having one signal conductor.

What is claimed is:

1. A video transmission system including in combination; a camera having an output terminal and means to develop a camera signal at said output terminal representing a selected object, a power supply for operating the camera, direct current conducting impedance means connected between the power supply and said output terminal and having a value selected to isolate said camera signal from said power supply, an antenna circuit for connection to an antenna to receive radiated signals generated by means other than said camera, a receiver circuit for connection to a receiver and located remotely from said camera for converting either of the signals into an image, a cable having a signal conductor direct current coupled to said output terminals, first switching means located near said receiver and connected to said signal conductor, said first switching means including a circuit and providing first and second direct current voltage levels to respectively render said camera operable and inoperable, second switching means having first, second and third contacts respectively coupled to said antenna circuit, said receiver circuit and said signal conductor, said first and second switching means being ganged together so that when said first switching means provides said second voltage level, said first and second contacts are connected whereby said receiver may receive the radiated signals, and so that when said first switching means provides said first voltage level, said first and third contacts are connected whereby said receiver may receive the camera signal.

2. The video transmission system according to claim 1, said cable being of the coaxial type and having a shield connected to a point of reference potential in said power supply, said power supply including cutoff means adapted to be connected to said point of reference potential to render said power supply inoperative, said direct current impedance means connected between said output terminal and said cutoff means, said first switching means connected between said signal conductor and said shield, said first and second direct current voltage levels being respectively open and shorted conditions of said first switching means.

3. The video transmission system according to claim 2, said camera having an output jack connected between said output terminal and said point of reference potential, a plug connected to said signal conductors and said shield and inserted in said output jack, said jack including means to short said output terminal to said point of reference potential when said plug is removed therefrom to render said camera inoperative.

4. A signal transmission system including in combination: a camera system including;

means to develop a camera signal representing a selected object, an output terminal at which said camera signal appears, a power supply for operating the camera, direct current connecting impedance means connected between the power supply and said output terminal and having a value selected to isolate said camera signal from said power supply, a first section of an audio intercom system including; electronic switching means having a control electrode and further having input and common electrodes respectively direct current coupled between said output terminal and a direct current potential, said switching means responsive to a direct current control signal having first and second levels to respectively render said power supply operative and inoperative, direct current circuit means connected to said control electrode, and a first sound transducer coupled to said circuit means, means coupled between said input electrode and said circuit means to conduct only said camera signal, a cable having a single signal conductor direct current connected to said circuit means, a second section of said audio intercom system including; an amplifier circuit having an amplifier device, an input circuit direct coupling said signal conductor to said amplifier circuit, a second sound transducer coupled to said amplifier circuit, an output circuit direct current connected to said amplifier circuit, feedback means coupled from said amplifier device to said input circuit, means connected between said input and output circuits to conduct only said camera signal, an antenna circuit for connection to an antenna to receive radiated signals generated by means other than said camera system, a receiver circuit for connection to a receiver and located remotely from said camera for converting said camera signal and said radiated signal into an image, a control system including:

first switching means direct current coupled to said output circuit and having first and second positions to respectively render said amplifier circuit operable and inoperable and to cause said amplifier device to generate said direct current control signal respectively having first and second levels, said control signal being translated to said electronic switching means by way of said feedback means, said input circuit, said cable and said direct current circuit means, second switching means having first, second and third contacts respectively coupled to said antenna circuit, said receiver circuit and said output circuit, said first and second switching means being ganged together so that when said first switching means is in said second position, said first and second contacts are connected whereby said receiver may receive said radiated signal, and so that when said first switching means is in said first position, said second and third contacts are connected whereby said receiver may receive said camera signal.

5. The signal transmission system according to claim 4, said second section of said audio intercom system further including switching means intercoupling said input and output circuits, said amplifier circuit and said second sound transducer to permit switching into a condition where sound supplied to said second sound transducer is amplified and emitted by said first sound transducer, and to permit switching into another condition where sound supplied to said first sound transducer is amplified and emitted by said second sound transducer.

6. The signal transmission system according to claim 4, said power supply including cutoff means adapted to be connected to a point of reference potential to render said power supply inoperative, said common electrode of said electronic switching means connected to said point of reference potential, said direct current impedance means connected between said output terminal and said cutoff means, said second level of said direct current control signal being of a polarity to render said electronic switching means conductive, whereby said input electrode is substantially at said reference potential to render said power supply inoperative.

7. The signal transmission system according to claim 4, said amplifier device comprising a transistor having first and second output electrodes, direct current voltage supply means, first and second resistance means respectively coupled to said output electrodes and in series with said supply means, said feedback means comprising a diode coupled to said first output electrode, with said second output electrode coupled through said output circuit to said control system, said first switching means having said second position in which said second output electrode is connected to a point of reference potential which renders said amplifier circuit inoperative and which forward biases said diode to conduct said second level of said direct current control signal through said circuit means to said electronic switching means.

8. The signal transmission system according to claim 4, said transistor being a PNP conductivity type, with said first output electrode being a collector and said second output electrode being an emitter, said diode having a cathode coupled to said collector and having an anode coupled to said input circuit.

9. The signal transmission system according to claim 4, said first section of said audio intercom system further including means coupled to said input electrode of said electronic switching means which along with said direct current circuit means isolate said camera signal from said electron switching means and said first sound transducer, said input and output circuits of said second section of said audio intercom system each including means to isolate said camera signal from said amplifier circuit and said second sound transducer.

References Cited

UNITED STATES PATENTS

| | | | |
|---|---|---|---|
| 2,978,538 | 4/1961 | Breese | 178—5.6 |
| 3,215,774 | 11/1965 | Ikegami | 178—5.6 |
| 3,423,521 | 1/1969 | Friesen et al. | 178—5.6 |
| 3,426,145 | 2/1969 | Kimball et al. | 178—6.8 |

ROBERT L. GRIFFIN, Primary Examiner

DONALD E. STOUT, Assistant Examiner

U.S. Cl. X.R.

178—6.8